J. H. FREY.
LAWN MOWER SHARPENER.
APPLICATION FILED MAR. 11, 1908.

903,371.

Patented Nov. 10, 1908.

Witnesses

Inventor
James H. Frey.
By
Attorneys

UNITED STATES PATENT OFFICE.

JAMES HENRY FREY, OF VINCENNES, INDIANA, ASSIGNOR OF ONE-HALF TO FRANK C. HARDACRE, OF VINCENNES, INDIANA.

LAWN-MOWER SHARPENER.

No. 903,371.    Specification of Letters Patent.    Patented Nov. 10, 1908.

Application filed March 11, 1908. Serial No. 420,457.

*To all whom it may concern:*

Be it known that I, JAMES H. FREY, a citizen of the United States, residing at Vincennes, in the county of Knox and State of Indiana, have invented a new and useful Lawn-Mower Sharpener, of which the following is a specification.

This invention relates to certain improvements in lawn mower sharpeners, and is particularly applicable to the subject matter of my Letters-Patent No. 654,146, dated July 24, 1900.

It has for its object to remedy certain objections or draw backs in the use of the aforesaid subject matter, especially in its application and adjustment for practical use, as will be hereinafter pointed out.

Said invention consists of certain features or instrumentalities substantially as hereinafter more fully disclosed and particularly pointed out by the claims.

Figure 1:
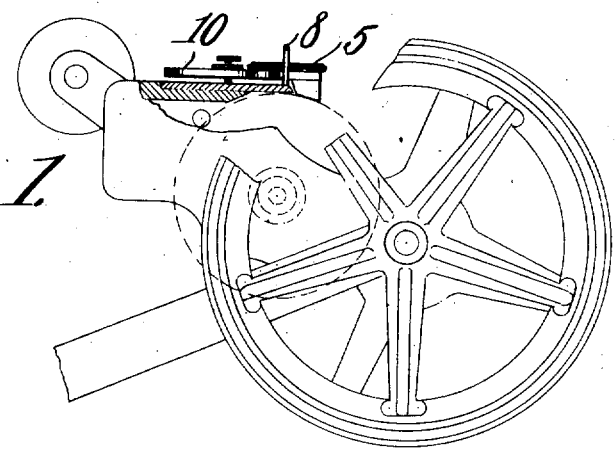
Figure 2:
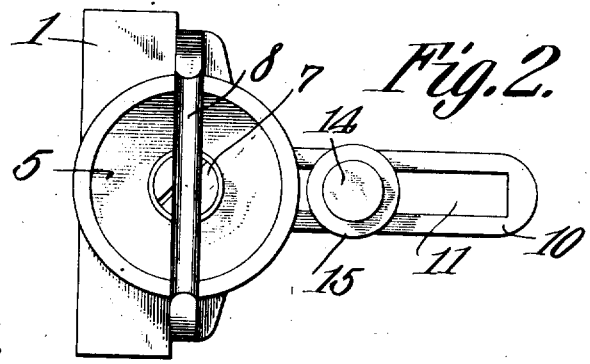
Figure 3:
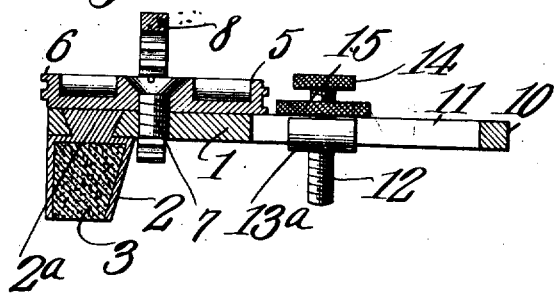
Figure 4:
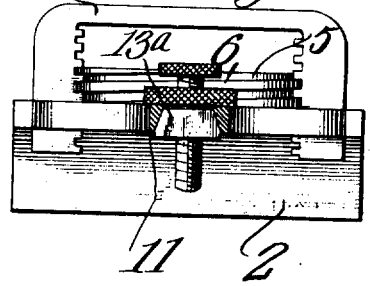

In the accompanying drawings, illustrating the preferred embodiment of my invention, Figure 1 is a side view, partly in section, showing the application of the sharpener to a lawn mower. Fig. 2 is an enlarged plan view of the sharpener. Fig. 3 is a longitudinal section thereof. Fig. 4 is a transverse section produced near the forward end of the sharpener.

Similar numerals of reference are employed to indicate corresponding parts throughout the several figures of the drawings.

In carrying out my invention I employ a plate 1 which has the general characteristics of the plate used for a like purpose in the aforesaid Letters Patent, and is provided as in said Letters Patent with an abrading or sharpening core or stone 3 contained in a casing 2 of preferably soft metal and having a dovetail or detachable connection 2ª with said plate. The plate has a rearward extension or arm 10 provided with an elongated slot 11 the opposite longitudinal walls of which are undercut or beveled in the direction of the base of said plate, as shown.

Arranged upon the plate 1 is a wheel or nut 5 having its periphery provided with screw threads 6 and its axis 7 provided with a screw threaded connection with said plate 1, said nut or wheel, however, being unthreaded and movable independently of its axis, it being held in place by a flared end of its axis resting in a counter-sink thereof.

The yoke member 8, arranged transversely with relation to said nut or wheel has its opposite inner surfaces provided with rack teeth, and extending down through opposite slots in the plate 1, said rack or teeth on said yoke having engagement with the screw threads of said nut or wheel, provided for the vertical adjustment of said yoke, the lower or vertical portions of said yoke serving as supports which rest upon the ledger bar of a lawn mower when the device is in use.

A screw 12 has its bearing in a slide 13ª of corresponding outline, and arranged to slide or move within the slot 11 of the plate extension 10. Said screw 12 has, also, at its upper end a preferably milled or knurled actuating head 14, and intermediately of said head and slide is also a knurled head member or nut 15 adapted to engage said screw and serve as a jam nut for the retention of said slide in fixed position.

As will be observed by reference to Fig. 1, with the device in position upon a lawn mower, the same being in inverted position, the lower ends of the yoke 8, together with the corresponding end of the screw 12 rest upon the ledger bar of said lawn mower with the abrading member or core 3 and its casing 2 arranged for engagement with the knives of the lawn mower as they are revolved by suitable means, preferably as described in said patent, to provide for the ready sharpening of said knives or cutters, which, of course, is effected without the removal of said knives from the lawn mower.

It will be noted that by means of the aforesaid arrangement of parts, the yoke member 8 is adapted to have its lower supporting ends to be adjusted simultaneously or uniformly in effecting the vertical adjustment of the sharpener bearing plate, whereby said sharpener with its casing are adapted to be evenly presented to the action of the knives or cutters of the lawn mower, and thus provide for the wearing away of said abrading or sharpening device evenly and uniformly. Also, it will be noted that by this uniform wearing away of the abrading or sharpening member, its lasting qualities will be also promoted as is apparent. Also, in the use of the jam nut, screw 12 and its sliding bearing 13ª, simplicity is promoted in dispensing with the use of additional screws and, also, provides for convenience of adjustment of the abrading bearing plate to the ledger bar of the lawn mower.

It will be understood that latitude may be provided herein for making changes in regard to various details of the construction, arrangement and disposition of the parts without departing from the spirit of my invention.

What is claimed is:—

1. A device of the class described including a sharpener bearing plate, a screw threaded wheel or nut having its axis or bearing arranged in said plate, a yoke arranged transversely of said nut or wheel, with its inner surfaces adapted to have engagement with the screw thread of said nut and its lower end to form bearings or supports for said plate, and additional supporting means for said plate arranged in connection therewith.

2. A device of the class described including a sharpener bearing plate provided with a nut or screw threaded wheel having pivotal or rotatable connection with said plate, a yoke arranged transversely of said nut or wheel and having its vertical portions extending downwardly below said plate to form bearings or supports, said yoke having its inner surface provided with teeth or racks effective for engagement with said nut.

3. A device of the class described including a sharpener bearing plate having a longitudinally slotted arm, the walls of the slot being undercut, a screw serving as a support for one end of said plate, a slide or bearing for said screw arranged in the slot of said arm and having its side walls inclined for engagement with the undercut walls of the slot, a clamp nut having a threaded connection with said screw and arranged to engage the upper end of said extension or arm, a screw threaded wheel or nut having pivotal connection with said sharpener carrying plate, and a yoke having opposite racks upon its inner surfaces adapted for engagement with said screw threaded wheel or nut, the lower ends of said yoke being adapted to serve as a support for the opposite end of said sharpener bearing plate.

4. A device of the class described including a sharpener bearing plate, a threaded member mounted for rotation on said plate, and a yoke embracing the threaded member and provided with means for engagement with the threads on said member, the ends of the yoke forming supports for said plate.

5. A device of the class described including a sharpener bearing plate, a member mounted for rotation on the upper surface of the plate and having its exterior walls threaded, a yoke embracing the threaded member and provided with oppositely disposed arms, the inner faces of which are provided with teeth for engagement with the threads on said member, the ends of the arms forming supports for said plate, and an abrading member secured to the lower surface of the plate.

In testimony that I claim the foregoing as my own, I have hereto affixed my signature in the presence of two witnesses.

JAMES HENRY FREY.

Witnesses:
WILL. DAWALT.
W. F. GWIN.